Oct. 22, 1963  D. N. SEWELL  3,107,967
ATTRAHENTLY BIASED SPRING CLAMP WITH QUICK-RELEASE
EXPANDING MEANS, USEFUL FOR COUPLING
WAVEGUIDE SECTIONS
Filed May 4, 1962  2 Sheets-Sheet 1
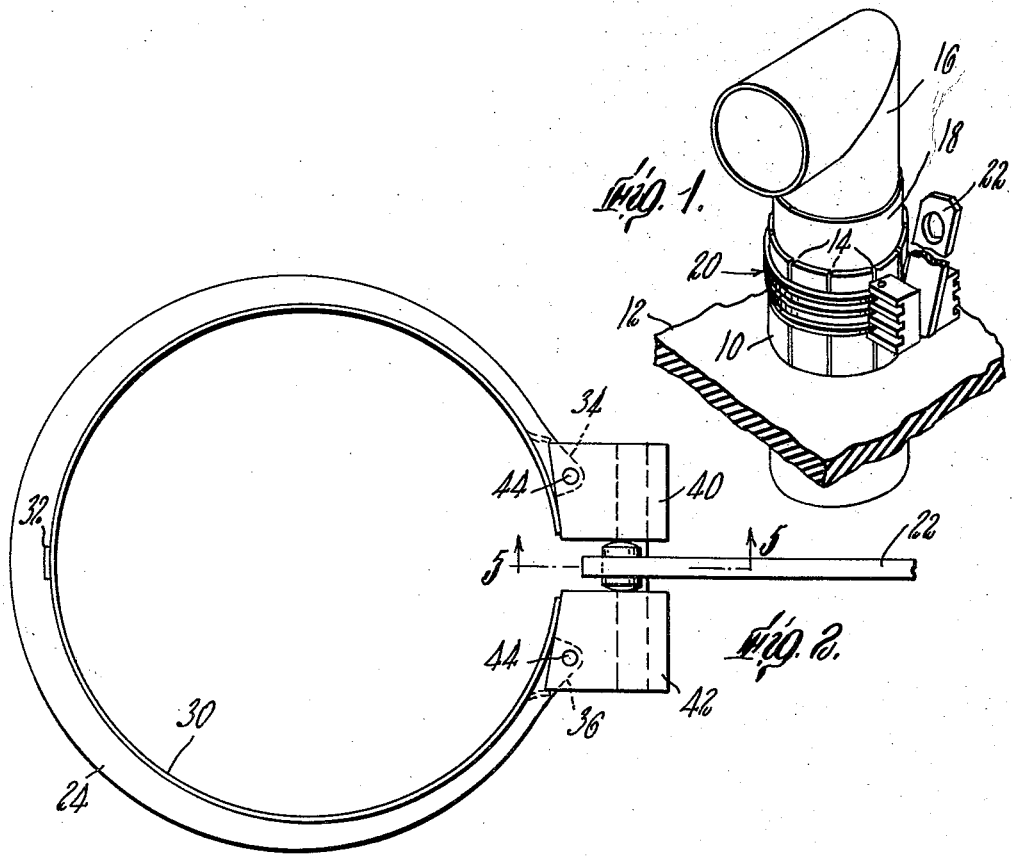
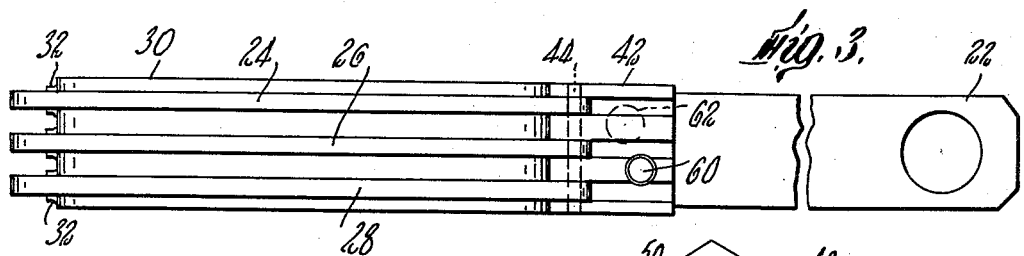
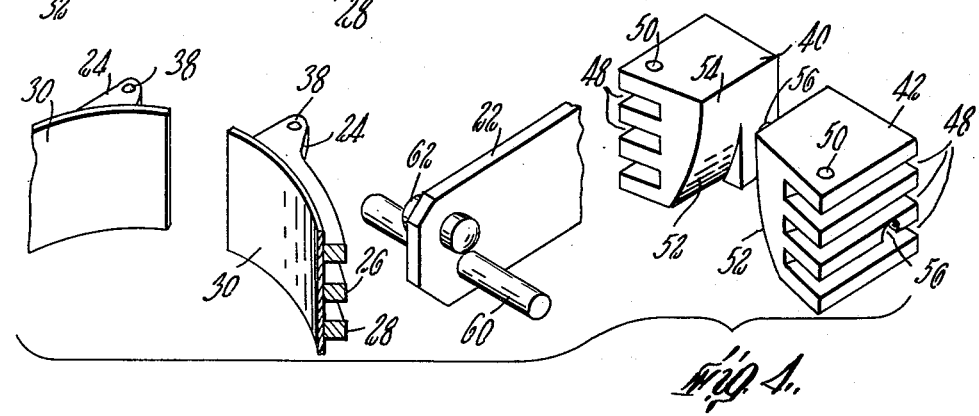

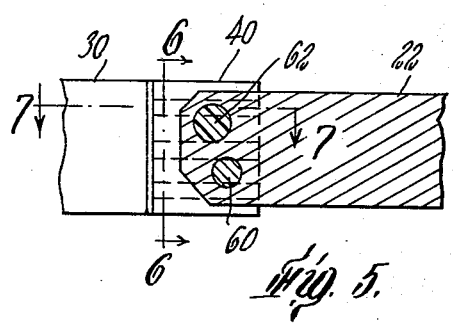
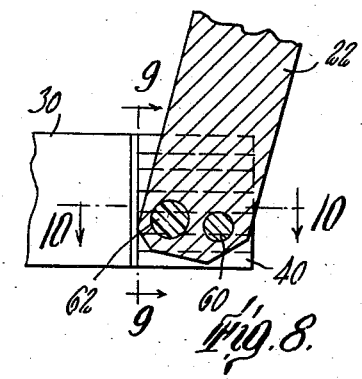
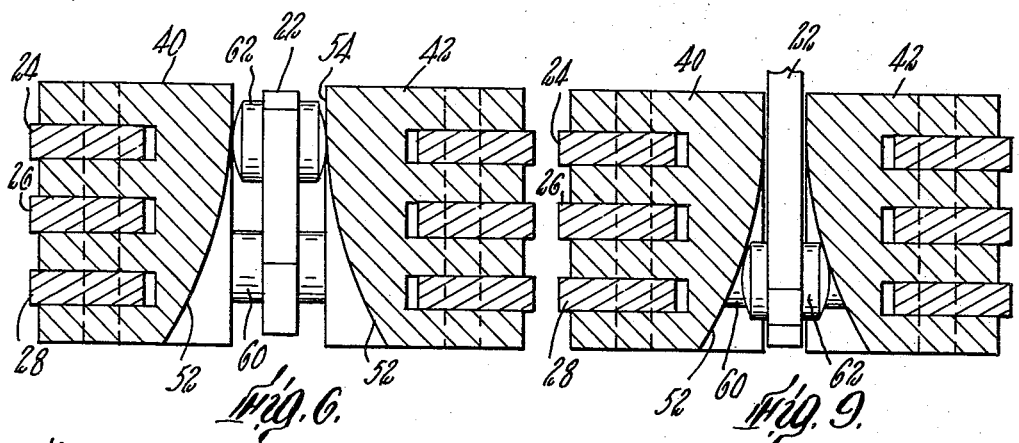
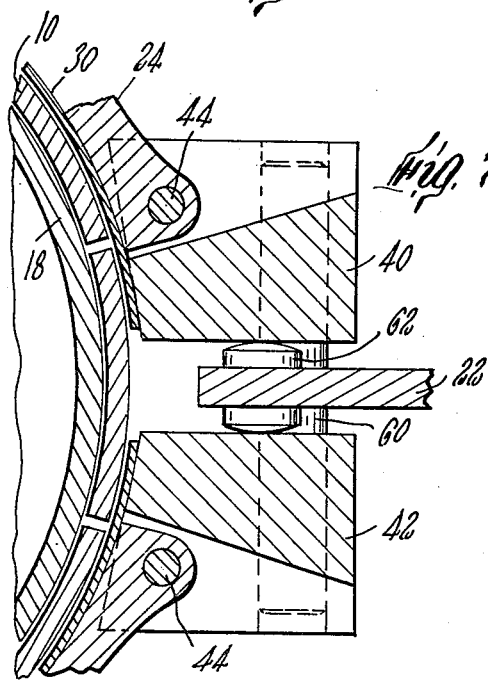
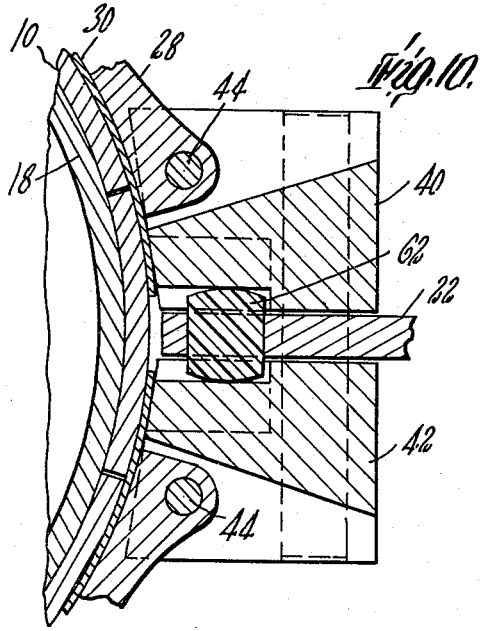

United States Patent Office 3,107,967
Patented Oct. 22, 1963

3,107,967
ATTRAHENTLY BIASED SPRING CLAMP WITH QUICK-RELEASE EXPANDING MEANS, USEFUL FOR COUPLING WAVEGUIDE SECTIONS
Donald N. Sewell, Raymond, Maine, assignor to Dielectric Products Engineering Company, Inc., Raymond, Maine, a corporation of Michigan
Filed May 4, 1962, Ser. No. 192,383
11 Claims. (Cl. 339—251)

This invention relates to electromagnetic wave transmission line coupling devices and more particularly to a new and improved clamping structure by means of which adjacent sections of a transmission line may be releasably coupled.

Both in test work and in transmission line circuit arrangements it is often desired to disconnect sections of transmission lines and rearrange their positions. A typical example of such rearrangements of connections is in a patch panel involving a multiplicity of cylindrical transmission line sections which are brought out to a panel which may be connected in various configurations by means of the coupling sections of similar transmission lines. A variety of clamping arrangements have been employed for such transmission line connections, for example, a threaded type of connector operator operates on a band that encircles one of the cylindrical sections as it is positioned concentrically over the end of a cooperating cylindrical section. By tightening screw type devices the band is reduced in diameter and constricts the outer connector section about the inner conductor section to provide adequate electrical current transmission characteristics between the two. However, many such transmission line arrangements dictate that the connectors are positioned in remote locations which make them difficult to operate. Further, the clamping force exerted by the connector often varies as a function of the location of the connector or of the method of tightening it. In addition, those types of connectors require a substantial amount of time to operate and often special tools are necessary to effect the coupling and/or decoupling action.

Accordingly, it is an object of this invention to provide an improved, quickly releasable transmission line coupling clamp.

Another object of the invention is to provide a positive acting transmission line coupling clamp which is compact and easy to operate without special tools.

A further object of the invention is to provide an improved coupling clamp of simple construction which is easy to manufacture and which provides more than adequate clamping force to insure proper electrical characteristics for the clamped joint, both in shielding and in current carrying capacity.

In accordance with the preferred embodiment of the invention there is provided a clamp structure employing a cylindrical liner for use on cylindrical transmission lines in which one line member is disposed inside the other member and the clamp operates on the outside member to urge the adjacent cylindrical surfaces of the two transmission line sections together. The clamp liner is encircled by and secured to a plurality of C-shaped clamping rings. The corresponding ends of the rings are pinned to a camming link so that the rings operate as a unit. Each camming link has a smoothly curved camming surface. A lever is pivotally secured between the two camming links and carries a cam member in the form of a rod offset from those pivot axis of the lever. The camming rod engages the camming surface of the links and is moved along them as the lever is pivoted. The liner of the clamp assembly when the clamp is in its unstressed condition has a circumference slightly smaller than the circumference of the transmission line elements that are to be clamped together. In use, the clamp lever is urged outwardly from a position substantially parallel to the plane of the clamp rings. In this movement the cam rod acts against the clamp ring links to force them apart, thereby increasing the inner circumference of the clamp liner so that it will slide freely over the larger of the two transmission line sections. When it is positioned over that transmission line section with the end of the other section placed in overlapping alignment therewith the handle is released so that the resiliency of the rings forces the liner band to decrease its effective circumference and tightly grasp the two transmission line sections so that an excellent electrical contact is provided between the two sections.

This clamp structure provides a uniformly high degree of clamping force and insures the requisite electrical characteristics for operation of the transmission line. It is a quick, positively acting clamp which requires no special tools for operation and which provides a clamping force not influenced by the person operating it. It is easy to operate, requiring only the movement of a lever through approximately 90°. Further, it is a compact structure in which, in the clamping position, the lever portion lies parallel to the transmission line section, in an out of the way location. The operating lever may be located at any position around the entire circumference of the transmission line as desired according to the transmission line arrangement on which it is used.

These and other objects, features and advantages of the invention will be seen as the following description of a preferred embodiment thereof progresses in conjunction with the drawings, in which:

FIG. 1 is a perspective view of a portion of a transmission line section secured with a clamp structure constructed in accordance with the principles of the invention;

FIG. 2 is a top view of the clamp structure constructed in accordance with the principles of the invention, showing the clamp structure in unclamped position;

FIG. 3 is a side view of the clamp structure of FIG. 2;

FIG. 4 is a perspective view of components of the clamp structure;

FIG. 5 is a sectional view taken along the line 5—5 of FIG. 2;

FIG. 6 is a sectional view taken along the line 6—6 of FIG. 5;

FIG. 7 is a sectional view taken along the line 7—7 of FIG. 5; and

FIGS. 8–10 are sectional views corresponding to FIGS. 5–7 with the operating lever rotated to clamping position.

With reference to FIG. 1 there is shown a transmission line section termination 10 mounted in an insulating support 12. The end of the section 10 has a plurality of axially extending slots 14. A cooperating transmission line section 16 (a portion of which is shown) has a cylindrical terminal portion 18 which is positioned inside the slotted terminal portion 14. A clamp structure 20 surrounds the slotted section 14 and acts to compress the elements of the section into tightly engaged relation with the terminal portion 18. The clamp 20 in the position shown in FIG. 1 has its handle 22 positioned generally parallel to the axis of the transmission line section so that it occupies a minimum amount of space. The clamp may be released merely by rotating the handle outwardly from the position perpendicular to the plane of the clamp to a position substantially parallel to the plane of the clamp, which rotation releases the clamping force exerted by the clamp structure and permits the clamp to be slid along the section or the connector section 16 to be removed or repositioned as desired.

A top view of the clamp structure is shown in FIG. 2 and side view in FIG. 3. As indicated in those figures the clamp structure includes three stacked spaced C-shaped metallic ring structures 24, 26, 28, on the inner periphery of which is secured a liner or band 30 which has a smooth inner surface and engages one of the transmission line sections to be clamped. This liner or band also aids in maintaining the desired alignment of the rings and has portions in the form of tabs 32 bent out to engage the rings as indicated in FIGS. 2 and 3. Each ring has opposed ends 34, 36, each of which has a hole 38 by means of which links or camming blocks 40, 42 are secured to the set of rings. The liner 30 extends past the ends of the rings and overlies the camming blocks to provide additional protection for the transmission line section. These camming blocks are pinned to the rings by means of chrome steel heat treated pins 44, and secured therein in suitable manner.

Each camming block, as best indicated in FIG. 4, has three slots 48 formed along its outer surface which receive the rings. An aperture 50 extends through the slots perpendicularly thereto for receiving the pin 44. On the inner surface of each block a smoothly curved camming surface 52 is formed. The camming surface is machined in a smooth radius from a point in the plane of the upper clamping ring so that the upper portion 54 of the camming surface is flat. Each camming block also includes a hole 56 bored perpendicularly to the ring securing pin aperture 50. Holes 56 receive the pivot rod 60 of the operating lever 22.

The operating lever shown in FIG. 4 is a flat piece of stock which has a pivot rod 60 secured therein by solder or other suitable means and a cam members 62 of nylon or other suitable material disposed parallel to but offset from the axis of the pivot pin 60. The ends of the camming member 62 are smoothly rounded and positioned equidistant on either side of the actuating lever 22 so that in assembly with the pivot rod 60 secured in the holes 56 in the camming blocks 40, 42 the actuating pin 62 is in engagement with the camming surfaces 52.

In operation with the handle 22 secured between the camming blocks 40, 42, the rings 24, 26, 28 in unstressed conditions compress the band 30 to a smaller circumference than the structure to be clamped. By rotating the handle 22 outwardly the camming pin 62 moves up along the camming surfaces 52 toward their flat surface portions 54 and forces the ends of the rings apart thereby increasing the effective circumference of the ring band. During this movement the blocks 40, 42 slide outwardly on the pivot rod 60 but remain in alignment under the restraining influence of that rod. In the position shown in FIGS. 5–7 the clamp structure is in its open position and may be slid along a transmission line section for proper positioning. In addition, due to the location of the axis of rotation of the lever 22 relative to the camming surfaces 52, 54 and the actuating pin 60 the lever in this position is stably positioned with pin 62 acting against the two parallel surfaces 54 of the camming blocks 40, 42. On movement of the lever so that the end surfaces of pin 62 engage the inclined camming surfaces 52 the compressive force of the rings 24, 26, 28 urging the camming blocks towards one another acts upon the pin 62 and rotates the lever 22 from its position substantially parallel to the plane of the clamp rings to a position substantially perpendicular to the clamp rings closely adjacent the transmission line sections to be clamped so that it occupies a minimal amount of space. The relation of the clamp components in this position is shown in FIGS. 8–10. The clamp only requires enough room for the lever to be rotated perpendicular to the axis of the transmission line section and it may be positioned at any position around its circumference which will permit this movement.

Thus it will be seen that the invention provides a new and improved quick release transmission line structure clamp which provides positive clamping action and which may be operated without any tools. Its actuating lever is manually movable between a clamping position and an unclamped position 90° away with proportioned resistance to the movement of the lever being exerted by the clamp structure. The clamping force exerted by the clamp is not influenced by the user or the clamp and thus increased uniformity in clamping pressures and assurance of adequate clamping force is achieved.

While a preferred embodiment of the invention has been shown and described, various modifications thereof will be obvious to those having ordinary skill in the art and therefore it is not intended that the invention be limited to the disclosed embodiment or to details thereof and departures may be made therefrom within the spirit and scope of the invention as defined in the claims.

I claim:
1. A clamp for releasably coupling electric wave transmssion sections having mating end surfaces, comprising
   a resilient C-shaped clamping element having a configuration generally conforming to the outer surfaces of the portions of the transmission sections to be clamped together and adapted to substantially surround those surfaces;
   said C-shaped element having two spaced opposed ends,
   means defining a camming surface extending generally perpendicularly to the plane of said clamping element at each said end of said clamping element so that a first set of camming surfaces spaced from one another are defined,
   camming means pivotally secured between said ends and including a second set of comming surfaces engageable with said first set of camming surfaces, the surface portions of one of said sets of camming surfaces being disposed so that the distance between them progressively becomes greater,
   and handle means secured to said camming means and rotatable about said camming means pivot to move said second set of camming surfaces along said first set of camming surfaces to force said spaced ends apart and thereby release the clamping pressure exerted by said clamping element.

2. A clamp for releasably coupling electric wave transmission sections having mating end surfaces, comprising
   a resilient C-shaped clamping element having a configuration generally conforming to the outer surfaces of the portions of the transmission sections to be clamped together and adapted to substantially surround those surfaces,
   said C-shaped element having two spaced opposed ends,
   cam block means defining a camming surface extending generally perpendicularly to the plane of said clamping element at each said end of said clamping element so that said camming surfaces are spaced from one another,
   said cam block means including a cylindrical bore extending generally parallel to the plane of said clamping element,
   a rod positioned in said cylindrical bore, a lever secured to said rod so that said lever is mounted for pivotal movement between said camming surfaces,
   and camming means carried by said lever in a location offset from said rod and engageable with said camming surfaces, the pivotal movement of said lever moving said camming means along said camming surfaces to force said spaced ends apart and thereby release the clamping pressure exerted by said clamping element.

3. The clamp as claimed in claim 2 wherein each said camming surface is a smoothly curved surface and includes a terminal portion disposed perpendicularly to the plane of said clamping element and said cam blocks are positioned so that the terminal portions of said camming surfaces are parallel to one another and are the portions of said camming surfaces closest to one another.

4. A quick release clamp for releasably coupling two cylindrical electric wave transmission sections having overlapping end portions, comprising
  a plurality of resilient C-shaped clamping elements in stacked relation,
  each element having two spaced opposed ends and an inner peripheral surface generally conforming to the outer surface of the portions of the transmission sections to be clamped together and adapted to substantially surround that surface,
  the normal configuration of said inner peripheral surface defining a periphery slightly smaller than the periphery of said outer surface so that said clamping elements when they surround said surface normally apply clamping pressure to said outer surface,
  the corresponding ends of said clamping elements being disposed in aligned relation,
  a camming block secured to each set of corresponding aligned ends, each said clamping block including a camming surface portion extending generally perpendicularly to the plane of said clamping elements with said camming surface portions disposed in spaced, inclined relation to one another,
  and a lever pivotally secured to said camming blocks for pivoting movement between said camming surface portions,
  said lever carrying camming means offset from lever pivot and in engagement with said camming surface portions and said lever being pivotable to move said camming means along said camming surface portions to force said spaced ends apart and thereby release the clamping pressure exerted by said clamping elements on the overlapping end portions of said transmission sections.

5. The clamp as claimed in claim 4 wherein said camming blocks include terminal surface portions adjacent said relatively inclined camming surface portions, said terminal surface portions being disposed parallel to and opposite one another.

6. A quick release clamp for releasably coupling two cylindrical electric wave transmission sections having overlapping end portions, comprising
  a plurality of resilient C-shaped clamping elements in stacked relation,
  each element having two spaced opposed ends and an inner cylindrical peripheral surface generally conforming to the outer surface of the portions of the transmission sections to be clamped together and adapted to substantially surround that surface,
  the normal configuration of said inner cylindrical surface defining a circumference slightly smaller than the circumference of said outer surface so that said clamping elements, when they surround said other surface, normally apply clamping pressure to said outer surface,
  the corresponding ends of said clamping elements being disposed in aligned relation,
  a camming block secured to each set of corresponding aligned ends of said clamping elements including a camming surface portion extending generally perpendicularly to the plane of said clamping elements with said camming surface portions disposed in spaced, inclined relation to one another,
  each said camming block including a cylindrical bore extending generally parallel to the plane of said clamping elements,
  a rod slidably positioned in said bores,
  a lever pivotally secured to said rod so that said lever is mounted for pivoting movement between said camming surface portions,
  and camming means carried by said lever in a location offset from said rod and engageable with said camming surface portions, the rotation of said lever about said pivot rod moving said camming means along said camming surface portions to force said spaced ends apart and thereby release the clamping pressure exerted by said clamping elements.

7. The clamp as claimed in claim 6 wherein said lever is an elongated member with said rod secured at one end thereof and said camming means is disposed at said one end in a position generally parallel to and offset from said rod, so that the clamping pressure exerted by said clamping element moves said lever into a position perpendicular to the plane of said clamping elements.

8. A quick release clamp for releasably coupling two cylindrical electric wave transmission sections having overlapping end portions, comprising
  a plurality of resilient C-shaped clamping elements in stacked relation,
  each element having two spaced opposed ends,
  a flat band secured to the inner peripheral surfaces of said clamping elements providing a smooth surface generally conforming to the outer surface of the portions of the transmission sections to be clamped together and adapted to substantially surround that surface,
  a camming block secured to each set of corresponding aligned ends of said clamping elements, each said camming block including a smoothly curved camming surface having a terminal portion extending perpendicularly to the plane of said clamping elements so that said camming surfaces are spaced from one another,
  a lever pivotally secured to said camming blocks for rotational movement between said camming surfaces about a pivot point defined by said camming block,
  and camming means carried by said lever in a location parallel to but offset from said pivot point and engageable with said camming surfaces,
  said clamping elements exerting a force on said camming means urging said lever into a position perpendicular to the plane of said clamping elements, and
  the rotation of said lever about said pivot point in an outward direction moving said camming means along said camming surfaces to force said spaced ends apart and thereby release the clamping pressure exerted by said clamping elements.

9. A quick release clamp for releasably coupling two cylindrical electric wave transmission sections having overlapping end portions, comprising
  a plurality of flat resilient C-shaped clamping rings in stacked relation,
  each clamping ring having two spaced opposed ends,
  a flat band secured to the inner peripheral surfaces of said clamping ring providing a smooth surface generally conforming to the outer surface of the portions of the transmission sections to be clamped together and adapted to substantially surround that surface,
  a camming block secured to each set of corresponding aligned ends of said clamping rings , each said camming block including a smoothly curved camming surface having a terminal portion extending perpendicularly to the plane of said clamping rings, said camming surfaces being spaced from one another,
  a lever pivotally secured to said camming blocks for rotational movement between said camming surfaces about a pivot point defined by said camming block, and
  camming means carried by said lever in a location parallel to but offset from said pivot point and engageable with said camming surfaces,
  said clamping rings exerting a force on said camming means urging said lever into a position perpendicular to the plane of said clamping rings, and
  the rotation of said lever about said pivot point in an outward direction moving said camming means along said camming surfaces to force said spaced ends apart and thereby release the clamping pressure exerted by said clamping rings.

10. The clamp as claimed in claim 8 wherein each said camming block further includes a slotted portion disposed circumferentially outwardly of said camming surface relative to said camming rings to receive in pinned relation the ends of said clamping rings, and a cylindrical bore extending parallel to the plane of the slots in said slotted portion, said cylindrical bore being disposed radially outwardly relative to said camming surface with respect to said camming rings, and a rod secured to said lever adapted to be received in sliding relation in said cylindrical bore to define said pivot point.

11. A clamp for releasably coupling electric wave transmission sections having overlapping end surfaces, comprising a resilient C-shaped clamping element having a configuration generally conforming to the outer surface of the portions of the transmission sections to be clamped together and adapted to substantially surround that surface, said C-shaped element having two spaced opposed ends, a clamp control member pivotally mounted between said ends, said clamp control member and said clamping element ends defining a set of cooperating camming elements, said set including a cam element and camming surfaces having a portion of graduated spacing and a latch portion, said control member being substantially aligned with the axis of said transmission sections in clamping position and movable therefrom to move said cam element along said portion of graduated spacing toward said latch portion to force said element ends apart and stress said clamping element to remove clamping pressure on said transmission sections, and holding said clamping element in stressed condition when said cam element engages said latch portion.

References Cited in the file of this patent

UNITED STATES PATENTS

| 2,109,517 | Xenis | Mar. 1, 1938 |
| 2,299,291 | Zam | Oct. 20, 1942 |

FOREIGN PATENTS

| 605,348 | Great Britain | July 21, 1948 |